(12) United States Patent
Tamura (10) Patent No.: US 6,319,581 B1
(45) Date of Patent: Nov. 20, 2001

(54) OPTICAL RECORDING MEDIUM (75) Inventor: Shinichiro Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/402,710

(22) PCT Filed: Apr. 8, 1998

(86) PCT No.: PCT/JP98/01627

§ 371 Date: Dec. 20, 1999

§ 102(e) Date: Dec. 20, 1999

(87) PCT Pub. No.: WO98/45838

PCT Pub. Date: Oct. 15, 1998

(30) Foreign Application Priority Data

Apr. 8, 1997 (JP) .................................................. 9-089761

(51) Int. Cl.⁷ ...................................................... B32B 3/02
(52) U.S. Cl. ...................... 428/64.1; 428/64.4; 428/64.8; 428/457; 428/913; 430/270.14; 369/288
(58) Field of Search ................................. 428/64.1, 64.4, 428/64.8, 457, 913; 430/270.14, 495.1, 945; 369/283, 288

(56) References Cited

U.S. PATENT DOCUMENTS

| 4,879,709 | 11/1989 | Clark ...................................... 369/284 |
| 5,128,849 | 7/1992 | Podraczky et al. ................... 369/284 |

FOREIGN PATENT DOCUMENTS

| 2005155 | 4/1979 | (GB) . |
| 59033191 | 2/1984 | (JP) . |
| 04134641 | 5/1992 | (JP) . |
| 5198001 | * 8/1993 | (JP) . |
| 7057300 | * 3/1995 | (JP) . |
| 9054980 | * 2/1997 | (JP) . |

OTHER PUBLICATIONS

E. Hamada, et al., "CD–compatible write–once disc with high reflectivity", Proceedings of the SPIE, vol. 1078, 1989, pp. 80–87.
O plus E, vol. 199, 1996, pp. 70–79.

* cited by examiner

Primary Examiner—Elizabeth Evans
(74) Attorney, Agent, or Firm—Sonnenschein, Nath & Rosenthal (57) ABSTRACT

An optical recording medium having a structure including that a recording layer containing organic coloring matter and a reflecting layer that are sequentially formed on a light-transmissive substrate thereof so that an information signal is recorded/reproduced when the optical recording medium is irradiated with a laser beam made incident on the light-transmissive substrate, the optical recording medium incorporating: a light absorbing layer which is formed more adjacent to an incident point of the laser beam as compared with the reflecting layer, through which the laser beam passes and which absorbs light in an absorption wavelength region for the recording layer. Photo-deterioration of the recording layer composed of organic coloring matter occurs owing to a portion of natural light which has the wavelength which exists in the absorbing wavelength region for the organic coloring matter. In the optical recording medium having the above-mentioned light absorbing layer, natural light made incident on the reflecting layer is shielded by the reflecting layer. Therefore, the recording layer is not irradiated with natural light. A portion of natural light made incident on the substrate which has the wavelength which exists in the absorbing wavelength region for the organic coloring matter is absorbed by the light absorbing layer and, therefore, attenuated. As a result, the quantity of light with which the recording layer is irradiated can be reduced.

34 Claims, 7 Drawing Sheets

OPTICAL RECORDING MEDIUM

BACKGROUND OF THE INVENTION

Technical Field

The present invention relates to an optical recording medium, and more particularly to a write-once optical recording medium containing organic coloring matter serving as a recording material thereof.

Since the age of information has come about, there has been an increasing need for large-capacity memories for recording information, such as images, voice and data, in a large quantities.

To meet the above-mentioned need, disc-shaped optical recording mediums have been widely used because of their various advantages of great recording capacity, satisfactory reliability because recording and reproducing operations are performed in a non-contact manner, portability, low cost and mass production.

As a recording material of the optical recording medium, a variety of materials have been suggested which are a thin film of a rare earth element-transition metal amorphous alloy, such as Tb-Fe-Co, a phase change material, such as Ge-Sb-Te, organic coloring matter, such as a cyanine dye, and other materials. The organic coloring matter is employed in a write-once optical recording medium which permits a user to perform a one time a writing operation. Since the organic coloring matter has no corrosiveness and little toxicity, the organic coloring matter has an advantage that environmental load can be reduced.

A specific structure of an optical recording medium including the organic coloring matter will now be described.

A typical optical recording medium has an air-sandwich structure in which two light transmissive substrates each having a recording layer containing the organic coloring matter formed thereon are bonded to each other in such a manner that the recording layers are disposed opposite to each other while an air layer is interposed between the two substrates. The optical recording mediums having the air-sandwich structures are commercially available as data recording mediums.

A has been suggested in "Proceeding of SPIE", Vol. 1078, pp. 1078, issued in 1989, in which a recording layer containing an organic coloring matter is inserted into a layer structure of a usual compact disk (CD) formed by sequentially forming, on a light transmissive substrate, a recording layer containing organic coloring matter, a light reflecting layer and a protective layer. The above-mentioned optical recording medium has a high reflectance not lower than 70% when a wavelength of 780 nm is use with the compact disk. Therefore, the foregoing optical recording medium attains a signal characteristic compatible with commercial compact disks after data has been recorded on the optical recording medium. The optical recording mediums have been used to record musical sound, images and data for personal computers and have garnered a substantial share in the market.

In the optical recording industrial field, optical systems for optically recording data have been researched and developed in addition to the recording materials and the structures of the mediums.

Data is recorded on the optical recording medium and reproduced from the same by irradiating the optical recording medium with a laser beam. When a recording operation is performed, laser beams are converged to the surface of a recording layer. Thus, the recording layer is optically changed within the formed laser spot so that pits are formed. When a reproducing operation is performed, laser beams are converged to the pit so as to detect the difference in the reflectance from a region in which no pit has been formed. The density at which data can be recorded on the optical recording medium is determined by the diameter of a laser spot formed by a laser beam. In inverse proportion to the diameter of the laser spot, the recording density can be raised.

On the other hand, the diameter of the laser spot is in proportion to $\lambda/NA$ (where NA is the number of apertures of an objective lens and $\lambda$ is the wavelength of the laser beam). The recording density of the optical recording medium is determined by the number of apertures NA of the objective lens having the corresponding optical diameter and the wavelength $\lambda$ of the laser beam. In proportion to the NA and in inverse proportion to $\lambda$, the recording density can be raised.

Therefore, research and development for shortening the wavelength of the semiconductor laser beam has been performed energetically. As reported in, for example, "O plus E", vol. 199, pp. 71 (1996), an attempt has been made to use semiconductor laser beams having wavelengths of 630 nm to 680 nm in the optical recording process. A so-called digital video disk (DVD) structured to be capable of obtaining a recording capacity which is six to eight times that of the CD employs a semiconductor laser beam having a wavelength of 635 nm or 650 nm.

Although the organic coloring matter is a preferred recording material for the optical recording medium, there arises a problem in that the coloring matter photo-deteriorates.

The coloring matter photo-deteriorates because the p-electron conjugated system in the chemical structure of the coloring matter is chemically changed and thus the color of the coloring matter is changed. Another fact has been found that singlet oxygen effects the mechanism of the photo-deterioration as well as the chemical change of the coloring matter. The singlet oxygen is generated when energy transfer takes place from an excited which is state realized because the coloring matter has absorbed light, to a normal state.

Therefore, an attempt has been made to employ a chemical substance for preventing the action of the singlet oxygen to prevent the photo-deterioration of the coloring matter.

That is, the singlet oxygen having an electrophilic characteristic attacks unsaturated bonds existing in the organic coloring matter, causing dioxetane to be generated. Moreover, the dioxetane is chemically changed so that the coloring matter is decomposed. Therefore, if a chemical substance which can easily be oxidized as compared with the double bond existing in the organic coloring matter is contained, the chemical substance is oxidized by the singlet oxygen in place of the coloring matter. Thus, exertion of the influence of the singlet oxygen on the organic coloring matter can be prevented. The chemical substance of the type which can easily be oxidized is exemplified by aromatic amine.

If a chemical substance having an exciting energy lower than the exciting energy of the singlet oxygen which is about 1000 $cm^{-1}$ is contained, energy transfer takes place from the singlet oxygen to the chemical substance. As a result, the singlet oxygen is returned to the normal state and deactivated. The chemical substance having the low exciting energy is exemplified by a nickel metal complex and a copper complex.

If the organic coloring matter is employed as the recording material, concurrent use of the above-mentioned chemical substance enables satisfactory light resistance to be realized.

However, use of the above-mentioned chemical substance causes the following problems to arise.

When a recording layer is formed by the organic coloring matter, the organic coloring matter is dissolved in a solvent so that a coating material made of the organic coloring matter is prepared. Then, the coating material made of the organic coloring matter is applied to the surface of the disk substrate. Then, the disk substrate is dried. When the chemical substance for preventing photo-deterioration of the coloring matter is employed, the chemical substance is dissolved in the coating material made of the organic coloring matter.

Since polycarbonate resin for making the substrate of the optical disk has a characteristic that it is affected by substantially all solvents except for alcohol, an alcohol solvent is required for the coating material made of the organic coloring matter.

However, a major portion of the chemical substance for preventing photo-deterioration of the coloring matter cannot easily be solved by the solvent. Therefore, it is very difficult to prepare a chemical substance which can sufficiently be solved by the alcohol.

Since the aromatic amine can easily be oxidized, the prepared aromatic amine cannot easily be refined. Thus, high purity aromatic amine cannot easily be obtained. What is worse, the cost cannot be reduced. As a result, the cost for manufacturing the optical disk cannot be reduced.

On the other hand, the chemical substance, such as the nickel metal complex, having the function of deactivating the singlet oxygen has poor absorbance in the laser wavelength region. If the chemical substance of the foregoing type is contained in the recording layer, the refractive index of the recording layer is undesirably changed. As a result, there arises a problem in that a degree of modulation of a signal required to perform reproduction cannot easily be obtained.

As described above, the process for adding the chemical substance for preventing photo-deterioration of the coloring matter has the various problems. Therefore, a substitute for the above-mentioned method has been required. However, another effective method has not been found.

SUMMARY OF THE INVENTION

An object of the present invention is to provide an optical recording medium which is capable of realizing satisfactory light resistance even if no chemical substance for preventing photo-deterioration is added to the recording layer or if the quantity of the chemical substance is very small.

To achieve the above-mentioned object, according to one aspect of the present invention, there is provided an optical recording medium having a structure including a recording layer containing organic coloring matter and a reflecting layer are sequentially formed on a light-transmissive substrate thereof so that an information signal is recorded/reproduced when the optical recording medium is irradiated with a laser beam made incident on the light-transmissive substrate, the optical recording medium comprising: a light absorbing layer which is formed more adjacent to an incident point of the laser beam as compared with the reflecting layer, through which the laser beam passes and which absorbs light in an absorption wavelength region for the recording layer.

The photo-deterioration of the recording layer composed of organic coloring matter occurs owing to a portion of natural light which has the wavelength which exists in the absorbing wavelength region for the organic coloring matter.

In the optical recording medium having the above-mentioned light absorbing layer, natural light made incident on the reflecting layer is shielded by the reflecting layer. Therefore, the recording layer is not irradiated with natural light.

A portion of natural light made incident on the substrate which has the wavelength which exists in the absorbing wavelength region for the organic coloring matter is absorbed by the light absorbing layer and, therefore, attenuated. As a result, the quantity of light with which the recording layer is irradiated can be reduced.

Therefore, if no chemical substance for preventing photo-deterioration is added to the recording layer or if the quantity of the chemical substance is very small, photo-deterioration can be prevented. Thus, light resistance can be imparted. Since the foregoing light absorbing layer permits transmission of a recording/reproducing laser beam, the recording sensitivity of the optical recording medium does not deteriorate.

These and other features of the invention(s) will become clearer with reference to the following detailed description of the presently preferred embodiments and accompanied drawings.

DETAILED DESCRIPTION OF THE PRESENTLY PREFERRED EMBODIMENTS

An optical recording medium according to the present invention contains organic coloring matter. A recording layer containing the organic coloring matter and a reflecting layer are sequentially formed on a light transmissive substrate. When the optical recording medium is irradiated with a laser beam from a position across the light transmissive substrate, an information signal can be recorded and reproduced. In addition to the above-mentioned basic structure of the optical recording medium according to the present invention, a light absorbing layer is provided at a position more adjacent to the laser beam source as compared with the reflecting layer, the light absorbing layer being arranged to permit transmission of the laser beam and absorb light in the wavelength region for the recording layer. The light absorbing layer is provided to prevent photo-deterioration of the organic coloring matter contained in the recording layer.

That is, photo-deterioration of the organic coloring matter takes place by incident of light having a wavelength included in the absorbing wavelength region for the organic coloring matter.

Figure 1:
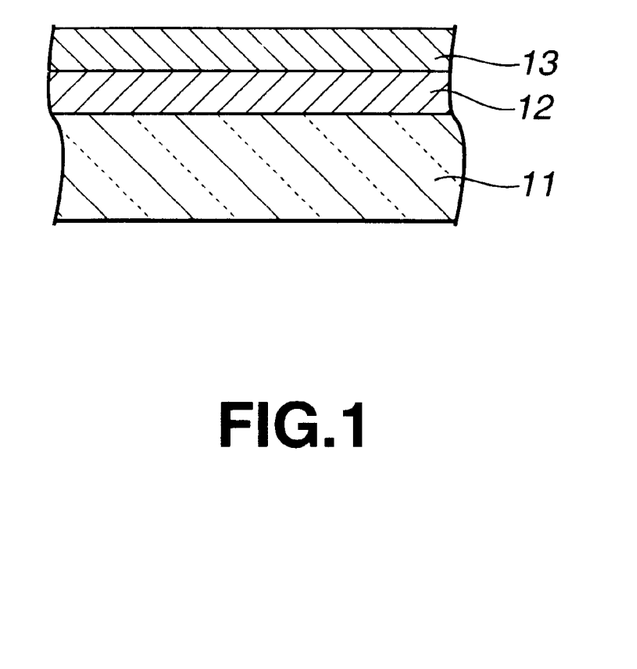
FIG. 1 is a schematic cross sectional view showing an optical recording medium having no light absorbing layer.

In a case of an optical recording medium having a recording layer 12 and a reflecting layer 13 formed on a light-transmissive substrate 11 and arranged not to include a light absorbing layer as shown in FIG. 1, natural light is made incident on the light-transmissive substrate 11. Thus, the recording layer 12 is directly irradiated with incident light. Moreover, light allowed to pass through the recording layer 12 is reflected by the reflecting layer 13, and then again applied to the recording layer 12. Applied light causes the organic coloring matter in the recording layer 12 to photo-deteriorate. Although natural light is also made incident on the reflecting layer 13, light made incident on the reflecting layer 13 is reflected by the reflecting layer 13. Thus, the recording layer 12 is not irradiated with light made incident on the reflecting layer 13. That is, photo-deterioration of the organic coloring matter takes place by natural light made incident on the light-transmissive substrate 11.

On the other hand, an optical recording medium according to the present invention has a light absorbing layer formed more adjacent to the laser beam source as compared with the reflecting layer 13, that is, adjacent to the substrate 11. Therefore, a portion of natural light made incident on the substrate 11 which corresponds to the absorbing wavelength region for the organic coloring matter is absorbed by the light absorbing layer and thus attenuated. As a result, the quantity of light with which the recording layer 12 is irradiated can be reduced. Thus, photo-deterioration of the organic coloring matter can be prevented. Since the foregoing light absorbing layer allows a recording/reproducing laser beam to pass through, the light resistance of the medium can be improved without any adverse influence on the recording/reproducing performance.

The position at which the light absorbing layer is formed is not limited particularly if the light absorbing layer is formed more adjacent to the substrate 11 as compared with the reflecting layer 13. An example of the structure of an optical recording medium is shown in FIG. 2 in which the light absorbing layer is formed on the light transmissive substrate on which a laser beam is made incident.

Figure 2:
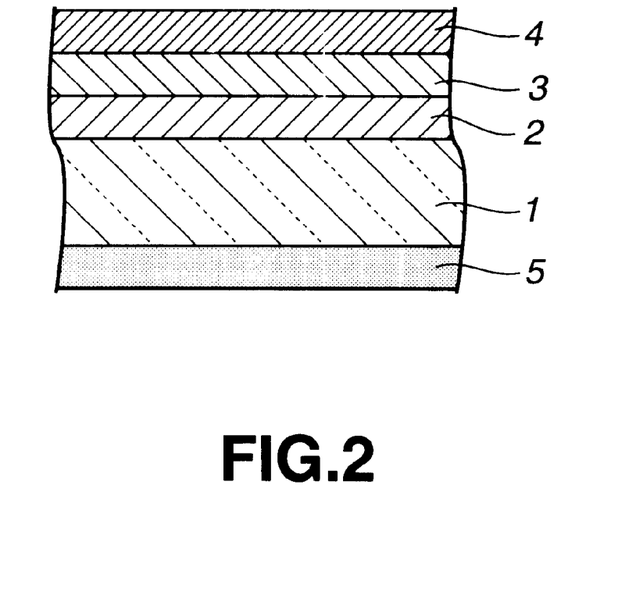
FIG. 2 is a schematic cross sectional view showing a first embodiment of an optical recording medium according to the present invention.

The optical recording medium shown in FIG. 2 has a structure including a recording layer 2 containing the organic coloring matter, a reflecting layer 3 and a protective layer 4 sequentially formed on a light-transmissive substrate 1. Moreover, a light absorbing layer 5 is formed on the light-transmissive substrate 1 on the surface opposite to the surface of the light-transmissive substrate 1 on which the recording layer 2 is formed.

The light-transmissive substrate 1 is formed into a disc shape having tracking grooves or pits formed into projections and pits provided for the surface thereof which is in contact with the recording layer 2.

The material of the transmissive substrate 1 is a polymer material, such as polymethacrylic resin, polycarbonate resin or a polyolefine. The employed polymer material is formed into the shape of the light-transmissive substrate 1 by, for example, injection molding or by extrusion molding. The light-transmissive substrate 1 may be a 2P-substrate having grooves or pits formed on a glass substrate by a 2P method (Photo-Polymer method). The light-transmissive substrate 1 may have an intermediate protective layer formed on the surface on which the recording layer is formed, the intermediate protective layer being provided for the purpose of protecting the light-transmissive substrate 1 from the solvent for the coating material made of the organic coloring matter.

The recording layer 2 is a layer containing the organic coloring matter. When the recording layer 2 is irradiated with a recording laser beam, the organic coloring matter in the laser spot generates heat because the organic coloring matter absorbs light and thus the organic coloring matter is decomposed. As a result, the reflectance of the region of the organic coloring matter is changed so that an information signal is recorded.

The organic coloring matter is exemplified by cyanine coloring matter, phthalocyanine coloring matter, porphyrin coloring matter, xanthene coloring matter, styryl coloring matter, indigo coloring matter, squallylium coloring matter, metal complex coloring matter and the like. Among the foregoing coloring matter, coloring matter may be selected which absorbs the wavelength of the recording/reproducing laser beam.

Although the recording layer 2 may be composed of only the organic coloring matter, the recording layer 2 may be formed into a layer in which the organic coloring matter is dispersed in a resin material.

The resin material may be vinyl resin, such as vinyl chloride resin or vinyl acetate resin; vinyl chloride-vinyl acetate copolymer; polystyrene resin; polyether sulfon; or silicon resin.

A chemical substance (a deactivator) for deactivating singlet oxygen may be added to the recording layer 2. The chemical substance may be a nickel metal complex compound, a copper complex compound, a hindered amine compound, an aromatic amine compound or aromatic ionium chloride. When the deactivating material is employed, the light resistance of the recording layer can furthermore be improved. Since the deactivator exerts an influence on the refractive index, only a small quantity may be added in such a manner that the refractive index is not affected considerably. Since the optical recording medium according to the present invention has the light absorbing layer 5, satisfactory light resistance can be realized if any deactivator is not added or the quantity of the same is very small.

The recording layer 2 is formed by dissolving the organic coloring matter in an organic solvent so that the coating material made of the organic coloring matter is prepared, the organic coloring matter being added together with the resin material and/or the deactivator as needed. Then, the coating material made of the organic coloring matter is applied to the surface of the light-transmissive substrate 1 by, for example, spin coating, and then the coating material made of the organic coloring matter is dried.

It is preferable that the solvent for preparing the coating material made of the organic coloring matter is able to satisfactorily dissolve the organic coloring matter and the deactivator and does not swell and dissolve the light-transmissive substrate 1.

When the polycarbonate resin is employed as the material of the substrate 1, a preferred material of the solvent is diacetone alcohol, 3-hydroxy-3-methyl-2-butanone, ethylene glycol monomethylether, ethylene glycol monoethylether, propylene glycol monomethylether, propylene glycol monoethylether or tetrafluoropropanol.

When a substrate manufactured by the glass 2P method is employed, cyclohexane, chloroform or 1,2-dichloroethane may be employed in addition to the foregoing solvent.

The solvent is not limited to the above-mentioned solvent. As a matter of course, another solvent may arbitrarily be employed.

The recording layer 2 may be formed by a dry method, such as a vacuum evaporation method, as well as the above-mentioned wet method.

It is preferable that the thickness of the recording layer 2 is 50 nm to 1000 nm. If the thickness of the recording layer 2 is smaller than the above-mentioned thickness, heat generated in the recording layer 2 by incidence of the irradiation with the laser beam is easily transmitted to the reflecting layer 3. Therefore, the laser beam cannot effectively be used to record information. If the thickness of the recording layer 2 is larger than 1000 nm, the volume of the recording layer 2, through which the laser beam is allowed to pass, is enlarged. Thus, the rate at which the temperature is raised per laser power is reduced. In this case, satisfactory optical change required to record information cannot be caused to occur.

The reflecting layer 3 is made of a metal material, such as gold, silver, copper or aluminum. Any one of the metal materials may be employed solely or their combination may be employed. The reflecting layer 3 is formed by a method for forming a thin film, such as a vacuum evaporation method, a sputtering method or an ion plating method.

The protective layer 4, which is formed on the reflecting layer 3, is additionally provided for the purpose of protecting the recording layer 2 and the reflecting layer 3 from external corrosive factors and impact.

The protective layer 4 is not required to be optically transparent. For example, a film made of ultraviolet curing resin is employed which is formed by coating ultraviolet curing resin by a spin coating method and by hardening the resin by applying ultraviolet rays. As an alternative to this, the protective layer 4 may be made of fluororesin, acrylic resin or urethane resin. Moreover, various additives and a filler may be added to the protective layer 4 in order to adjust the viscosity and improve the contraction characteristic and moisture resistance.

On the other hand, a light absorbing layer 5 is formed on the surface of the light-transmissive substrate 1 opposite to the surface on which the above-mentioned layers are formed. The light absorbing layer 5 permits a laser beam to pass through and absorbs light in the wavelength region which can be absorbed by the recording layer 2.

The light absorbing layer 5 is made of coloring matter, such as pigment or a dye. The pigment or the dye may be an organic substance or an inorganic substance. Specifically, any one of the following materials may be employed.

The pigment may be lake pigment made of a natural dye, such as madder lake or logwood lake; lake pigment made of a synthetic dye; nitroso pigment, such as naphthol yellow S; pigment chlorine GG; nitro pigment, such as Lithol Fast Yellow GG; azo pigment, condensed azo pigment; anthraquinone pigment; dioxane pigment; quinacridone pigment; thioindigo pigment; or phthalocyanine pigment.

The dye may be an azo dye, such as a monoazo dye, a polyazo dye, a metal complex salt azo dye, a pyrazolone azo dye, a stilbene azo dye or a thiazole dye; an anthraquinone dye containing, in the chemical structure thereof, an anthraquinone derivative or an anthrone derivative; an indigoid dye containing, in the chemical structure thereof, an indigo derivative and a thioindigo derivative; a carbonium dye, such as a diphenylmethane dye, a triphenylmethane dye, a xanthene dye or an acridine dye; a quinonimine dye, such as an azine dye, an oxazine dye or a thiazine dye; a methine dye, such as a cyanine dye or azemethine dye; a quinoline dye; a nitro dye; a nitroso dye; a benzoquinone dye; a naphthoquinone dye; a naphthalimide dye; a perylene dye; a xanthene dye; or a phthalocyanine dye.

To form the light absorbing layer 5, coloring matter may be selected from the materials in the above-mentioned group through which the laser beam is able to pass and which absorbs at least a portion of light in the absorbing wavelength region for the recording layer 2.

Figure 3:
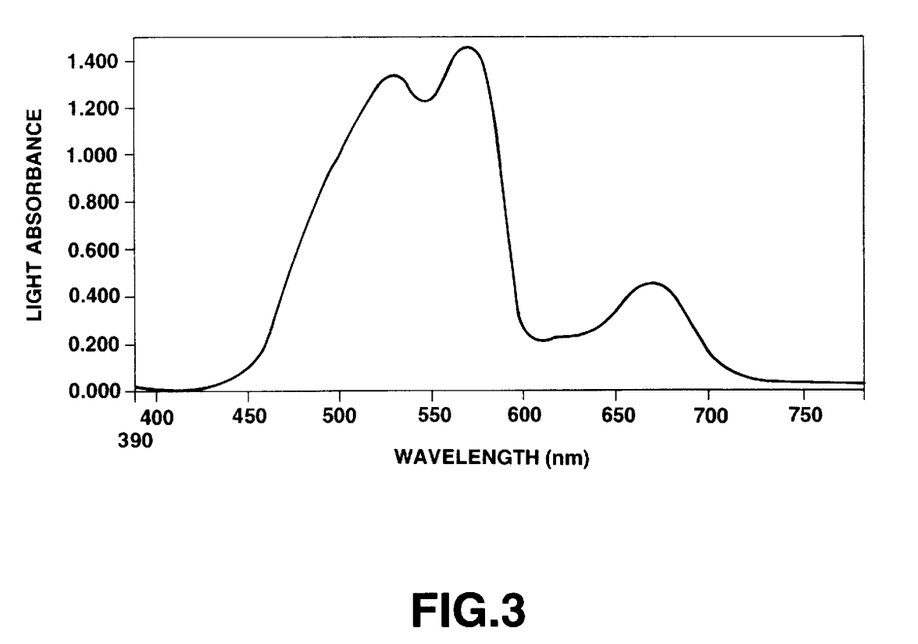
FIG. 3 is a graph showing the characteristic absorption spectrum of a light absorbing layer made of trimethine cyanine coloring matter and pentamethine cyanine coloring matter.

FIG. 3 shows an absorption spectrum of the recording layer 2 made of the cyanine coloring matter (a mixture of trimethine cyanine coloring matter and pentamethine cyanine). The recording layer 2 made of the cyanine coloring matter has a high absorption peak at 450 nm to 600 nm and a lower absorption peak at 630 nm to 700 nm. In a wavelength region longer than 700 nm, absorption is gradually reduced.

When the recording layer 2 has the above-mentioned absorption spectrum, the recording layer 2 easily photo-deteriorates by incidence of light having the wavelength from 450 nm to 600 nm corresponding to the high absorption peak. Therefore, light in the above-mentioned wavelength region must be shielded to satisfactorily improve the light resistance.

To shield light in the above-mentioned wavelength region, the light absorbing layer 5 is caused to absorb at least light in the wavelength region from 450 nm to 600 nm. To satisfactorily improve the light resistance of the recording layer 2, it is preferable that the absorbance which is realized in the above-mentioned wavelength region is at least 0.1 or greater, more preferably 0.3 or greater.

To record/reproduce an information signal, the recording/reproducing laser beam made incident on the light-transmissive substrate 1 must reach the recording layer 2. To cause the laser beam to reach the recording layer 2, the laser beam is permitted to pass through the light absorbing layer 5. The wavelength of the recording/reproducing laser beam varies among the types of the optical recording mediums. For example, the DVD (Digital Video Disk) is adapted to a wavelength of 635 nm and the CD-R (Compact Disk Recordable) is adapted to a wavelength of 780 nm.

Therefore, the coloring matter for forming the light absorbing layer 5 which is combined with the recording layer 2 made of the cyanine coloring matter must absorb light in the wavelength region from 450 nm to 600 nm. When the DVD is manufactured, coloring matter for forming the light absorbing layer 5 must permit light having a wavelength from 620 nm to 650 nm to pass through. When the CD-R is manufactured, coloring matter for forming the light absorbing layer 5 must permit light having a wavelength from 760 nm to 800 nm to pass through. Although the structure has been described in which the cyanine coloring matter forms the recording layer 2, a similar structure may be employed when the other coloring matter is employed to form the recording layer 2. That is, the coloring matter for forming the light absorbing layer 5 must be selected in accordance with the absorption spectrum of the recording layer 2 and the wavelength of the recording/reproducing laser beam.

It is preferable that also the reflectance of the coloring matter is considered which reflects the recording/reproducing laser beam. The coloring matter in the DVD must have a reflectance of 50% to reproduce an information signal. The coloring matter in the CD-R must have a reflectance of 70% to reproduce an information signal. Therefore, the coloring matter in the light absorbing layer 5 must be selected to realize the reflectance of 50% or 70% in the above-mentioned case.

Only one coloring matter material may be employed or two or more types of the coloring matter materials may be employed or a stacked structure may be employed with which the absorption wavelength characteristic can be optimized. If the employed coloring matter cannot easily be formed into a required shape, a layer may be employed in which the pigment or the dye is dispersed in appropriate resin, such as vinyl resin, such as vinyl chloride resin or a vinyl acetate resin; vinyl chlorides-vinyl acetate copolymer; polystyrene resin; polyether sulfon; or silicon resin.

The light absorbing layer 5 may be formed by a method having a step of preparing a coating material by dispersing the coloring matter in an organic solvent and a step of coating the surface of the light-transmissive substrate 1 with the coating material by a coating method selected from a group consisting of a spin coating method, a web coating method, a gravure coating method and a dye coating method. When the resin is concurrently used, the resin is required to be added to the coating material.

The light absorbing layer 5 may be formed by a dry method, such as a vacuum evaporation method. A method may be employed in which a film containing the coloring matter is previously formed and then the film is bonded. Another method may be employed in which two layers, one of which is a layer (the substrate 1) containing no coloring matter and another layer of which is a layer (the light absorbing layer 5) containing the coloring matter are simultaneously formed.

Even if the optical recording medium having the above-mentioned light absorbing layer 5 is exposed to light having a wavelength in the region in which photo-deterioration takes place, light made incident on the protective layer 4 is shielded by the reflecting layer 3. Light made incident on the light absorbing layer 5 is absorbed by the light absorbing layer 5. Therefore, irradiation of the recording layer 2 with light in the above-mentioned wavelength region can be prevented. Thus, photo-deterioration of the recording layer 2 can be prevented and satisfactory light resistance can be realized.

Figure 4:
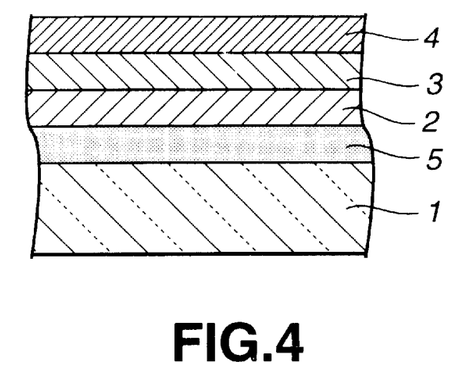
FIG. 4 is a schematic cross sectional view showing another embodiment of the optical recording medium according to the present invention.

As described above, the optical recording medium according to this embodiment has a structure such that the light absorbing layer 5 is formed on the light-transmissive substrate 1 on the surface opposite to the surface on which the recording layer 2 is formed. As an alternative to this, the light absorbing layer 5 may be formed between the light-transmissive substrate 1 and the recording layer 2, as shown in FIG. 4. Another structure shown in FIG. 5 may be employed in which the light-transmissive substrate 1 also serves as the light absorbing layer 5.

That is, the optical recording medium shown in FIG. 4 has a structure such that the light absorbing layer 5, the recording layer 2, the reflecting layer 3 and the protective layer 4 are formed on the light-transmissive substrate 1.

When the optical recording medium is exposed to the light in the wavelength region in which photo-deterioration takes place, light made incident on the protective layer 4 is shielded by the reflecting layer 3. Since light made incident on the light-transmissive substrate 1 is absorbed by the light absorbing layer 5 at the position in front of the recording layer 2, incidence of light in the above-mentioned wavelength region on the recording layer 2 can be prevented. As a result, photo-deterioration of the recording layer 2 can be prevented and satisfactory light resistance can be realized. Since the recording/reproducing laser beam is able to pass through the light absorbing layer 5, a satisfactory recording sensitivity can be obtained.

The materials and methods of forming the light-transmissive substrate 1, the recording layer 2, the reflecting layer 3, the protective layer 4 and the light absorbing layer 5 of the above-mentioned optical recording medium may be the materials and methods employed to manufacture the optical recording medium shown in FIG. 2.

Figure 5:
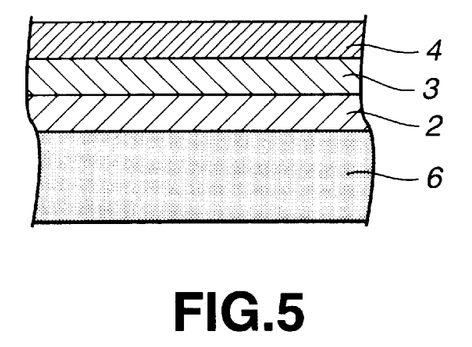
FIG. 5 is a schematic cross sectional view showing another embodiment of the optical recording medium according to the present invention.

The optical recording medium shown in FIG. 5 has a structure such that the recording layer 2, the reflecting layer 3 and the protective layer 4 are formed on the substrate 6 which also serves as the light absorbing layer.

When the above-mentioned optical recording medium is exposed to light in the wavelength region in which photo-deterioration takes place, light made incident on the protective layer 4 is shielded by the reflecting layer 3. Light made incident on the substrate 6 is absorbed by the substrate (the light absorbing layer) 6 at a position in front of the recording layer 2. Thus, irradiation of the recording layer 2 with light in the above-mentioned wavelength region can be prevented. Therefore, photo-deterioration of the recording layer 2 can be prevented and satisfactory light resistance can be realized. Since the recording/reproducing laser beam is able to pass through the substrate 6, a satisfactory recording sensitivity can be obtained.

The materials and methods of forming the recording layer 2, the reflecting layer 3 and the protective layer 4 of the above-mentioned optical recording medium may be the materials and methods employed to manufacture the optical recording medium shown in FIG. 2.

The substrate 6 is made of a plastic substrate containing a pigment or a dye for realizing the function of the light absorbing layer. The pigment and dye to be contained in the substrate 6 may be those employed as the above-mentioned materials of the light absorbing layer.

The plastic substrate is manufactured by sprinkling the pigment or the dye on the powder resin, and then an injection molding method or an extrusion molding method is employed to form the material into the required shape of the substrate. As an alternative to this, master batches containing the resin and the coloring matter at high densities are mixed with each other, after which the mixture is molded into the required shape of the substrate.

If the substrate 6 also serves as the light absorbing layer, the light absorbing layer is not required to be added to the basic structure of the optical recording medium. Therefore, an advantage can be realized in that the manufacturing process can be simplified.

Figure 6:
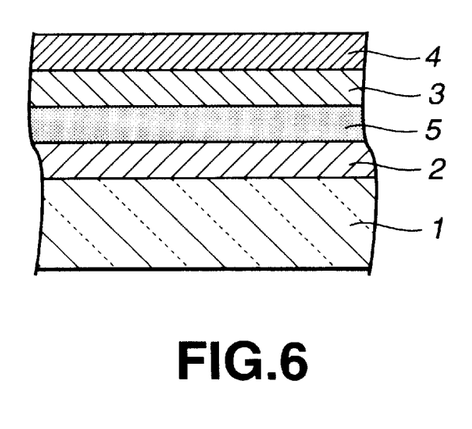
FIG. 6 is a schematic cross sectional view showing another embodiment of the optical recording medium according to the present invention.

The light absorbing layer may be formed between the recording layer 2 and the reflecting layer 3, as shown in FIG. 6.

When the optical recording medium having the light absorbing layer 5 formed between the recording layer 2 and the reflecting layer 3 is exposed to light in the wavelength region in which photo-deterioration takes place, light made incident on the protective layer 4 is shielded by the reflecting layer 3. Although light made incident on the light-transmissive substrate 1 is temporarily applied to the recording layer 2, light allowed to pass through the recording layer 2 is absorbed by the light absorbing layer 5 formed on the recording layer 2. Therefore, reflection of light by the reflecting layer 3 and irradiation of the recording layer 2 with light can be prevented. As a result, photo-deterioration of the recording layer 2 can be prevented. Since the recording/reproducing laser beam is able to pass through the light absorbing layer 5, a satisfactory recording sensitivity can be realized.

The materials of the light-transmissive substrate 1, the recording layer 2, the reflecting layer 3, the protective layer 4 and the light absorbing layer 5 may be those for manufacturing the optical recording medium shown in FIG. 2.

Since the recording layer 2 is, in the foregoing case, temporarily irradiated with light made incident on the light-transmissive substrate 1, the structures shown in FIGS. 2, 4 and 5 may concurrently be employed so that the light absorbing layer 5 is formed between the recording layer 2 and the reflecting layer 3. Moreover, another light absorbing layer may be formed in front of the recording layer 2 so as to shield the recording layer 2 by the two light absorbing layers.

The combination of the light absorbing layers is not limited to the above-mentioned combination. Any one of the above-mentioned structures may be combined. Three or more light absorbing layers may be provided.

Although the above-mentioned optical recording mediums have the single-substrate structure in which the recording layer 2, the light absorbing layer and the like are formed on one light-transmissive substrate 1, the optical recording medium according to the present invention may be formed into a twin-substrate structure formed by bonding another substrate to the single-substrate structure.

The substrate to be bonded may be a single-substrate disk having the light-transmissive substrate on which the recording layer, the protective layer and the like are formed. The recording layer may be a recording layer containing the organic coloring matter as the recording material or a metal reflecting layer (a write-once recording layer) having pits and projections with which the information signals have been recorded. As a matter of course, another recording layer may be employed. When the organic coloring matter is employed as the recording material, the light absorbing layer is formed by the above-mentioned method.

When the single-substrate disks are bonded to each other, the protective layers of the disks are bonded to each other by an adhesive agent or a pressure sensitive adhesive double coated tape. When the adhesive agent for use to bond the disks also has the function of the protective layer, the protective layer of each single-substrate disk can be omitted from the structure.

The substrates to be bonded to each other may be substrates which do not relate to the process for optically recording information, that is, substrates each having no recording layer. In this case, the light transmissivity is not required for each substrate. Therefore, a design pattern may be printed on the surface of the substrate or the surface is arranged to permit writing with an implement for writing.

Also in the foregoing case, the substrate may be bonded to the protective layer of the single-substrate disk by an adhesive agent of the pressure sensitive adhesive double coated tape.

Examples of the present invention will now be described in such a manner that results of experiments are described.

Preliminary Experiment 1

A color glass filter was assumed to be the light absorbing layer and an effect of the same was investigated as preliminary experiments for evaluating (1) the structure in which the light absorbing layer was provided for the surface of the substrate opposite to the surface of the same on which the recording layer was formed, (2) the structure in which the substrate also had the function of the light absorbing layer and (3) the structure in which the light absorbing layer was formed between the substrate and the recording layer.

Initially, trimethine cyanine coloring matter ("NK4287" trade name of Nihon Kanko Shikiso) and penta methine cyanine coloring matter ("NK3345" trade name of Nihon Kanko Shikiso) were mixed at a mixture ratio of 10 part by weight : 1 part by weight so that a mixture was prepared. The mixture was dissolved in diacetone alcohol at a ratio of 3 wt %/volume % so that a solution of the coloring matter was prepared.

The solution of the coloring matter was spin-coated to the surface of a 3 cm×3 cm polycarbonate substrate having a thickness of 0.6 mm so that a recording layer having a thickness of about 100 nm was formed. Thus, a sample was manufactured. The light absorption spectrum of the sample was as shown in FIG. 3.

<Light Irradiation Test>

Four samples (Sample 1, Sample 2, Sample 3 and Comparative Example Sample 1) were manufactured by the above-mentioned method.

The surface of the substrate of each sample was placed opposite to a light source (a 500 W short-arc xenon lamp). Each of Samples 1 to 3 was irradiated with light for 20 hours in a state where a color glass filter was disposed between the sample and the light source and the comparative example sample was irradiated with light similarly in a state in which the color glass filter was not disposed. The following color glass filters were employed when Samples 1 to 3 were tested.

Sample 1: yellow filter ("Y-50" trade name of Toshiba)
Sample 2: orange filter ("O-55" trade name of Toshiba)
Sample 3: red filter ("R-60" trade name of Toshiba)

After the samples were irradiated with light as described above, the light absorption spectrum of each sample was again measured.

As a result, absorption of Comparative Example Sample 1 irradiated with light without the color glass filter was halved as compared with the absorption realized before the irradiation.

On the other hand, Example 1 using the yellow filter maintained absorption of 65% of absorption realized before irradiation, Example 2 using the organic filter maintained absorption of 83% of absorption realized before irradiation and Example 3 using the red filter maintained absorption of 92% of absorption realized before irradiation.

The results of the above-mentioned preliminary test pointed to a fact that interposition of the layer for absorbing light between the recording layer and external light prevents photo-deterioration of the recording layer.

EXAMPLE 1

(example in which the substrate had the function of the light absorbing layer)

Figure 7:
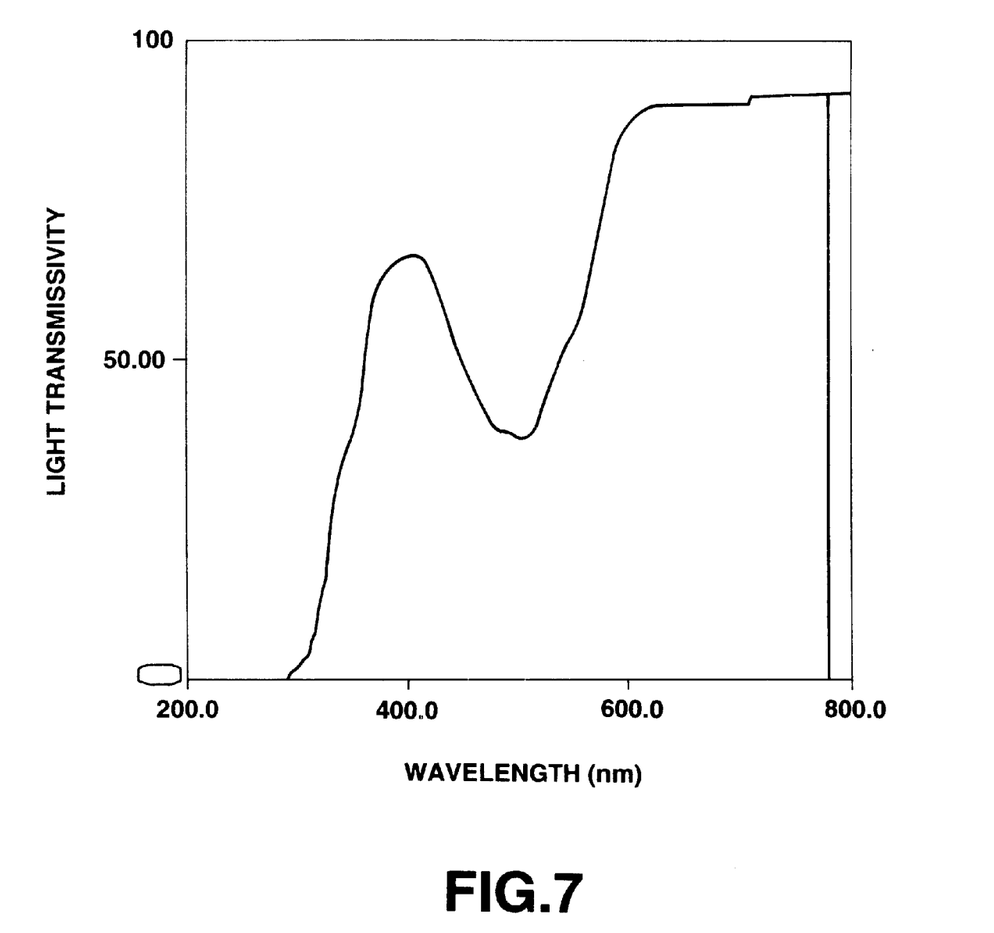
FIG. 7 is a graph showing the light transmission spectrum of a light absorbing layer made of LQC-4314RED.

A resin material prepared by adding a coloring matter ("LQC4314RED" which was trade name of Toyo Ink and which was pigment, the main component of which was quinacridone) to polycarbonate resin at a ratio of 0.6 wt % was molded into a disc shape having a thickness of 0.6 mm. Thus, a disk substrate was manufactured. The light transmission spectrum was shown in FIG. 7.

Then, a mixture obtained by mixing trimethine cyanine coloring matter and pentamethine cyanine coloring matter at a ratio of 10 parts by weight: 1 part by weight was dissolved in diacetone alcohol at a ratio of 3 wt %/volume % so that a solution of the coloring matter was prepared. Then, the disk substrate was spin-coated with the solution of the coloring matter so that a recording layer having a thickness of about 100 nm was formed.

Then, a reflecting layer made of gold was formed on the recording layer by a vacuum evaporation method in which resistance heating process was performed. The thickness of the reflecting layer was about 100 nm.

Then, ultraviolet curing resin was applied to the surface of the reflecting layer, and then the ultraviolet curing resin was irradiated with ultraviolet rays. Thus, a protective layer was formed, and then a glass epoxy resin substrate was bonded to the protective layer by a pressure sensitive adhesive double coated tape. As a result, an optical disk (disk sample 1) was manufactured.

<Light Irradiation Test>

The optical disk manufactured as described above was irradiated with light which is made incident on the substrate for 40 hours. A light source was a 500 W short-arc xenon lamp.

As a comparative example, an optical disk (Comparative Example Disk 1) having the structure in which no coloring matter was added to the substrate was similarly irradiated with light.

The reflectance of each of the optical disks realized before and after the light irradiation process and when the wavelength was 635 nm was measured so as to be subjected to a comparison.

As a result, Comparative Example Disk 1 having the substrate to which no coloring matter was added had a reflectance of 50% of the reflectance realized before irradiation when the wavelength was 635 nm. After the irradiation process, the reflectance was raised to 65%.

On the other hand, the reflectance of the disk sample 1 having the substrate to which the coloring matter was added resulted in slight rise in the reflectance.

Then, a recording test of disk sample 1 was performed by using 640 nm red semiconductor laser beam. The recording test was performed under the following conditions.

Recording Laser Beam: 640 nm Red Semiconductor Laser Beam

NA of Objective Lens: 0.6

Linear Speed: 3.29 m/second

Pit Length: 8 $\mu$m

When the intensity of the laser beam was varied during the recording operation test to which the disk sample 1 was subjected, a fact was confirmed that the light recording operation was started at about 6.5 mW. When a recording operation was performed by using a laser beam having an intensity of 11 mW, a degree of signal modulation of not lower than 60% was obtained.

As a result, a fact was found that the structure having the substrate which had the light absorbing layer was effective to prevent photo-deterioration of the recording layer.

EXAMPLE 2

(example in which the light absorbing layer was formed between the substrate and the recording layer)

Polycarbonate resin was molded into a disc shape having a thickness of 1.2 mm so that a disk substrate was manufactured.

Figure 8:
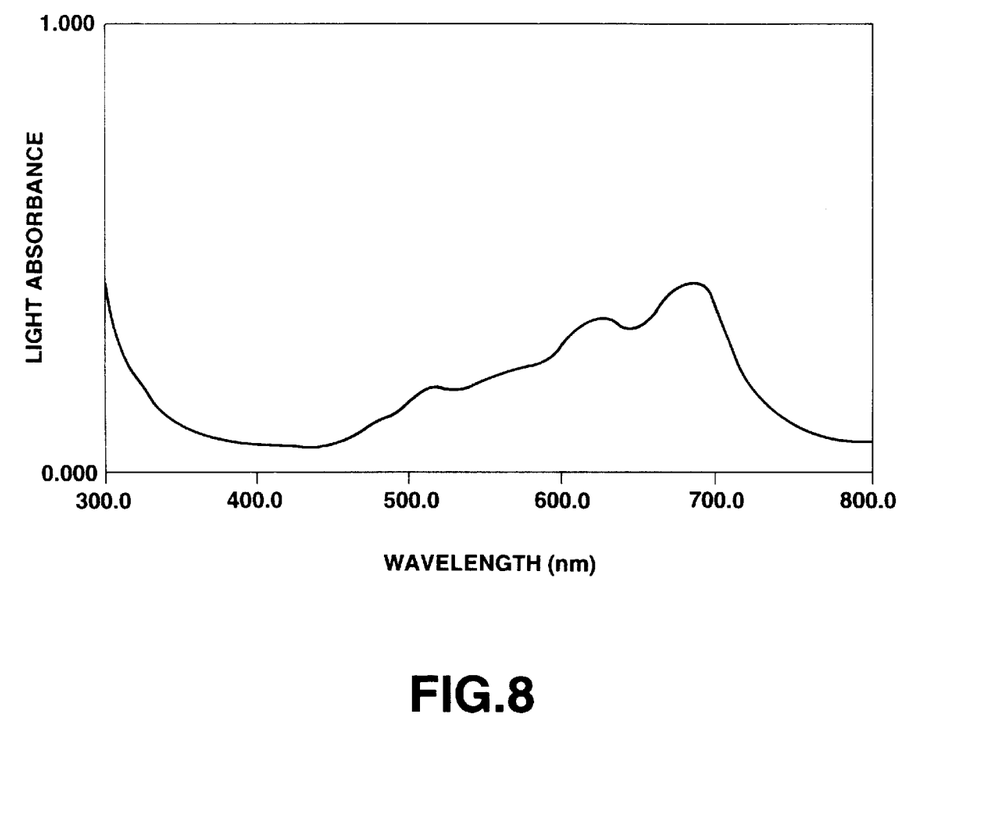
FIG. 8 is a graph showing the light transmission spectrum of a light absorbing layer made of Sumi Plast Blue OA.

Then, a light absorbing layer made of coloring matter (Sumi-Plast Blue OA trade name of Sumitomo Chemical) was formed on the disk substrate by the vacuum evaporation method in which resistance heating was performed. The absorption spectrum of the formed light absorbing layer was shown in FIG. 8.

Figure 9:
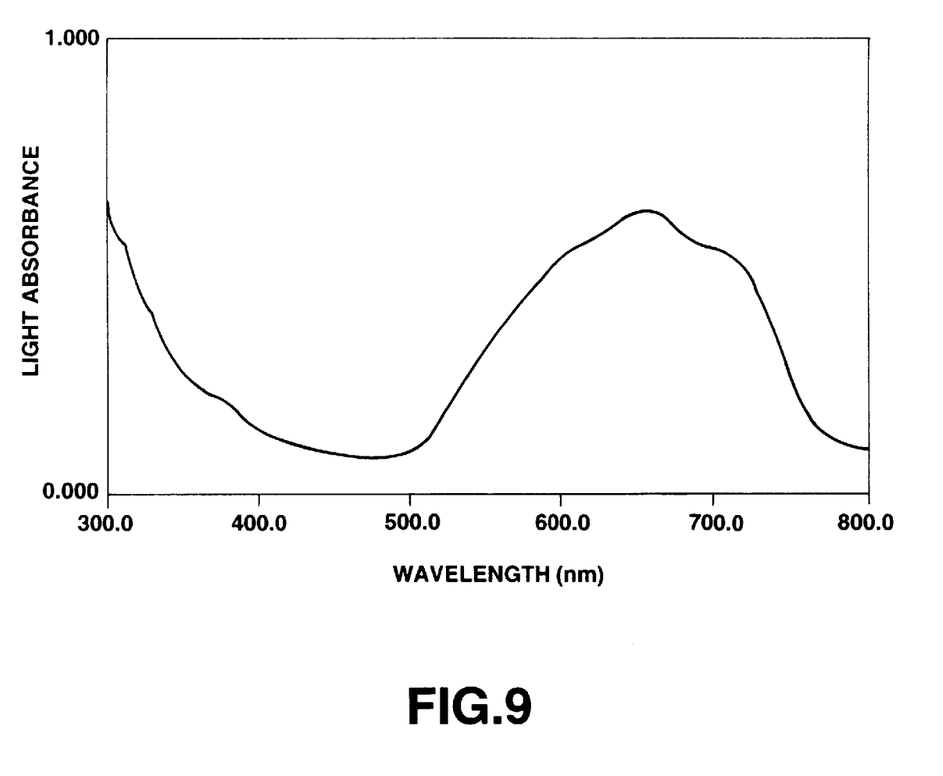
FIG. 9 is a graph showing the light transmission spectrum of a recording layer made of benzindoline pentamethine cyanine coloring matter.

Then, benzindoline pentamethine cyanine coloring matter was dissolved in a diacetone alcohol solution at a ratio of 3 wt %/volume % so that a coloring matter solution was prepared. The light absorbing layer was spin-coated with the coloring matter solution so that a recording layer having a thickness of about 100 nm was formed. The light absorption spectrum of the formed recording layer is shown in FIG. 9.

Then, gold was vacuum-evaporated on the recording layer by a resistance heating method so that a reflecting layer was formed. The thickness of the reflecting layer was about 100 nm.

Then, ultraviolet curing resin was applied to the surface of the reflecting layer, and then ultraviolet rays were applied. Thus, a protective layer was formed so that an optical disk (disk sample 2) was manufactured.

<Light Irradiation Test>

The optical disk manufactured as described above was irradiated with light which was made incident on the substrate for 40 hours. A light source was a 500 W short-arc xenon lamp was employed.

As a comparative example, an optical disk (Comparative Example Disk 2) having the structure in which the light absorbing layer was omitted between the substrate and the recording layer was similarly irradiated with light.

The reflectance of each of the optical disks realized before and after the light irradiation process and when the wavelength was 635 nm was measured so as to be subjected to a comparison.

As a result, Comparative Example Disk 3 having no light absorbing layer had a reflectance of 70% of the reflectance realized before irradiation when the wavelength was 635 nm. After the irradiation process, the reflectance was raised to 80%.

On the other hand, the reflectance of the disk sample 3 having the light absorbing layer between the substrate and the recording layer resulted in a slight rise in the reflectance from 70% to 72%

Then, a recording test of disk sample 2 was performed by using a 780 nm semiconductor laser beam. The recording test was performed under the following conditions.

Recording Laser Beam: 780 nm Semiconductor Laser Beam

NA of Objective Lens: 0.45

Linear Speed: 3.29 m/second

Pit Length: 8 $\mu$m

When the intensity of the laser beam was varied during the recording operation test to which the disk sample 2 was subjected, a fact was confirmed that the light recording operation in which an EFM signal was recorded was started at about 7 mW. When a recording operation was performed by using a laser beam having an intensity of 8 mW, a degree of signal modulation of not lower than 60% was obtained.

As a result, a fact was found that the structure having the light absorbing layer between the substrate and the recording layer was effective to prevent photo-deterioration of the recording layer.

Preliminary Experiment 2

A color glass filter was assumed to be the light absorbing layer and an effect of the same was investigated as preliminary experiments for evaluating (4) the structure in which the light absorbing layer was formed between the recording layer and the reflecting layer.

Similarly to the Preliminary Experiment 1, a recording layer composed of trimethine cyanine coloring matter and penta methine cyanine coloring matter was formed on a 3 cm×3 cm polycarbonate substrate so that samples were manufactured.

<Light Irradiation Test>

Four samples (Sample 4, Sample 5, Sample 6 and Comparative Example Sample 2) were manufactured by the above-mentioned method.

The surface of the substrate of each sample was placed opposite to a light source (a 500 W short-arc xenon lamp). An aluminum-evaporated mirror was disposed adjacent to the recording layer. A color glass filter was inserted between the recording layer and the evaporated mirror in the cases of the Samples 4 to 6. In the case of the comparative example sample, no color glass filter was inserted. Each of the samples was irradiated with light for 20 hours. The following color glass filters were employed when Samples 4 to 6 were tested.

Sample 4: yellow filter ("Y-50" trade name of Toshiba)

Sample 5: orange filter ("O-55" trade name of Toshiba)

Sample 6: red filter ("R-60" trade name of Toshiba)

After the samples were irradiated with light as described above, the light absorption spectrum of each sample was again measured.

As a result, absorption of Comparative Example Sample 2 irradiated with light without the color glass filter was reduced to 30% of the absorption realized before the irradiation.

On the other hand, Example 4 using the yellow filter maintained absorption of 52% of absorption realized before irradiation, Example 5 using the organic filter maintained absorption of 65% of absorption realized before irradiation and Example 6 using the red filter maintained absorption of 83% of absorption realized before irradiation.

The results of the above-mentioned preliminary test pointed to a fact that interposition of the layer for absorbing light between the recording layer and the reflecting layer prevents photo-deterioration of the recording layer.

EXAMPLE 3

(example in which the light absorbing layer was formed between the recording layer and the reflecting layer)

Polycarbonate resin was molded into a disc shape having a thickness of 0.6 mm so that a disk substrate was manufactured.

Then, a mixture obtained by mixing trimethine cyanine coloring matter and pentamethine cyanine coloring matter at a ratio of 10 parts by weight: 1 part by weight was dissolved in diacetone alcohol at a ratio of 3 wt %/volume % so that a solution of the coloring matter was prepared. Then, the disk substrate was spin-coated with the solution of the coloring matter so that a recording layer having a thickness of about 100 nm was formed.

Figure 10:
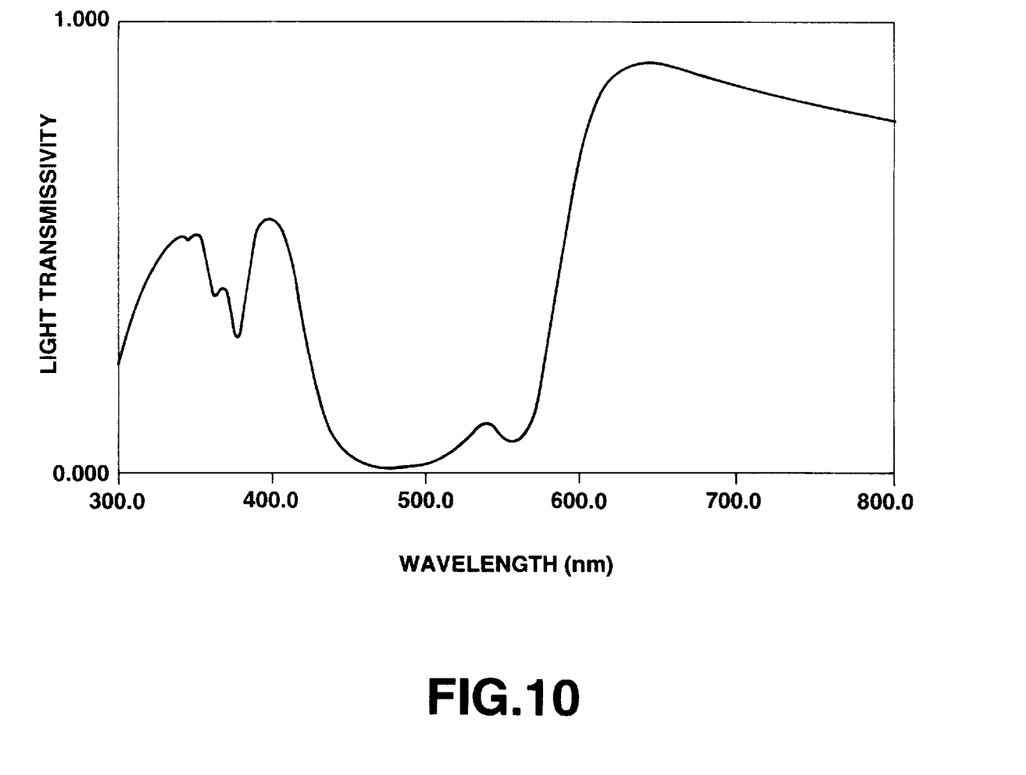
FIG. 10 is a graph showing the light transmission spectrum of a light absorbing layer made of perylene tetracarboxylic acid anhydride.

Then, a light absorbing layer made of perylene tetracarboxylic acid anhydride was formed on the recording layer by the vacuum evaporation method. The light transmission spectrum of the perylene tetracarboxylic acid anhydride was shown in FIG. 10.

Then, a reflecting layer made of gold was formed on the recording layer by a vacuum evaporation method in which a resistance heating process was performed. The thickness of the reflecting layer was about 100 nm.

Then, ultraviolet curing resin was applied to the surface of the reflecting layer, and then the ultraviolet curing resin was irradiated with ultraviolet rays. Thus, a protective layer was formed, and then a glass epoxy resin substrate was bonded to the protective layer by a pressure sensitive adhesive double coated tape. As a result, an optical disk (disk sample 3) was manufactured.

<Light Irradiation Test>

The optical disk manufactured as described above was irradiated with light which was made incident on the substrate for 40 hours. A light source was a 500 W short-arc xenon lamp.

As a comparative example, an optical disk (Comparative Example Disk 3) having the structure in which the light absorbing layer was omitted between the recording layer and the reflecting layer was similarly irradiated with light.

The reflectance of each of the optical disks realized before and after the light irradiation process and when the wavelength was 635 nm was measured so as to be subjected to a comparison.

As a result, Comparative Example Disk 3 having no light absorbing layer had a reflectance of 50% of the reflectance realized before irradiation when the wavelength was 635 nm. After the irradiation process, the reflectance was raised to 75%.

On the other hand, the reflectance of the disk sample 3 having the light absorbing layer formed between the recording layer and the reflecting layer was slightly raised from 50% to 55%.

A recording test of the disk sample 3 was performed under the same conditions as those according to Example 1. As a result, a fact was confirmed that the light recording operation with the disk sample 3 was started at about 6.2 mW. When a recording operation was performed by using a laser beam having an intensity of 10 mW, a degree of signal modulation of not lower than 60% was obtained.

As a result, a fact was found that the structure having the substrate which had the light absorbing layer formed between the recording layer and the reflecting layer was effective to prevent photo-deterioration of the recording layer.

The reason why the sensitivity of the disk sample 3 was somewhat improved as compared with disk sample 1 was considered that the light absorbing layer formed between the recording layer and the reflecting layer confines heat in the recording layer. Although modifications and changes may be suggested by those of ordinary skill in the art, it is the intention of the inventors to embody within the patent warranted hereon all changes and modifications as reasonably and properly come within the scope of their contribution to the art.

What is claimed is:

1. An optical recording medium having a structure including a recording layer containing organic coloring matter and a reflecting layer being sequentially formed on a light-transmissive substrate thereof, an information signal being recorded/reproduced on said recording layer when said optical recording medium is irradiated with a laser beam made incident on the light-transmissive substrate, said optical recording medium comprising:

a light absorbing layer formed between said recording layer and said reflecting layer and through which the laser beam passes and which absorbs natural light in an absorption wavelength region of said recording layer.

2. The optical recording medium according to claim 1, wherein said light transmissive substrate comprises at least one material selected from a group consisting of polymethacryl resin, polycarbonate resin and polyolefine resin.

3. The optical recording medium according to claim 1, wherein said organic coloring matter comprises at least one material selected from a group consisting of cyanine coloring matter, phthalocyanine coloring matter, porphyrin coloring matter, xanthene coloring matter, styryl coloring matter, indigo coloring matter, squallylium coloring matter and metal complex coloring matter.

4. The optical recording medium according to claim 3, wherein said recording layer is formed by dispersing said organic coloring matter in a resin material.

5. The optical recording medium according to claim 4, wherein said resin material comprises at least one material selected from a group consisting of vinyl chloride resin, vinyl acetate resin, vinyl chloride-vinyl acetate copolymer, polystyrene resin, polyether sulfon and silicon resin.

6. The optical recording medium according to claim 1, wherein said recording layer includes a deactivator comprising at least one material selected from the group consisting of a nickel metal complex compound, a copper complex compound, a hindered amine compound, an aromatic amine compound and aromatic ionium chloride.

7. The optical recording medium according to claim 1, wherein said recording layer has a thickness of 50 nm to 1000 nm.

8. The optical recording medium according to claim 1, further comprising a protective layer formed on said reflecting layer.

9. The optical recording medium according to claim 1, wherein said light absorbing layer comprises a material selected from the group consisting of a pigment and a dye.

10. The optical recording medium according to claim 9, wherein said pigment comprises one material selected from a group consisting of lake pigment, nitroso pigment, nitro pigment, azo pigment, condensed azo pigment, anthraquinone pigment, quinacridone pigment, thioindigo pigment and phthalocyanine pigment.

11. The optical recording medium according to claim 9, wherein said dye comprises at least one material selected from a group consisting of an azo dye, an anthraquinone dye, an indigoid dye, a carbonium dye, a quinonimine dye, a methine dye, a quinoline dye, a nitro dye, a benzoquinone dye, a naphthoquinone dye, a naphthalimide dye, a perylene dye, a xanthene dye and a phthalocyanine dye.

12. An optical recording medium having a structure including a recording layer containing organic coloring matter and a reflecting layer being sequentially formed on a light-transmissive substrate thereof and a substrate being bonded to said reflecting layer through an adhesive layer, an information signal being recorded/reproduced when said optical recording medium is irradiated with a laser beam made incident on the light-transmissive substrate, said optical recording medium comprising:
    a light absorbing layer formed more adjacent to an incident point of the laser beam as compared with said reflecting layer, through which the laser beam passes and which absorbs natural light in an absorption wavelength region of said recording layer,
    wherein said light absorbing layer is formed between said recording layer and said reflecting layer.

13. The optical recording medium according to claim 12, wherein said bonded substrate is a glass epoxy resin substrate.

14. The optical recording medium according to claim 12, wherein said light-transmissive substrate comprises at least one material selected from a group consisting of polymethacryl resin, polycarbonate resin and polyolefine resin.

15. The optical recording medium according to claim 12, wherein said organic coloring material comprises at least one material selected from a group consisting of cyanine coloring matter, phthalocyanine coloring matter, porphyrin coloring matter, xanthene coloring matter, styryl coloring matter, indigo coloring matter, squallylium coloring matter and metal complex coloring matter.

16. The optical recording medium according to claim 14, wherein said recording layer is formed by dispersing said organic coloring matter in a resin material.

17. The optical recording medium according to claim 16, wherein said resin material comprises at least one material selected from a group consisting of vinyl chloride resin, vinyl acetate resin, vinyl chloride-vinyl acetate copolymer, polystyrene resin, polyether sulfon and silicon resin.

18. The optical recording medium according 12, wherein said recording layer includes a deactivator comprising at least one material selected from a group consisting of a nickel metal complex compound, a copper complex compound, a hindered amine compound, an aromatic amine compound and aromatic ionium chloride.

19. The optical recording medium according to claim 12, wherein said recording layer has a thickness of 50 nm to 1000 nm.

20. The optical recording medium according to claim 12, further comprising a protective layer formed on said reflecting layer.

21. The optical recording medium according to claim 12, wherein said light absorbing layer comprises a material selected from the group consisting of a pigment and a dye.

22. The optical recording medium according to claim 21, wherein said pigment comprises at least one material from a group consisting of lake pigment, nitroso pigment, nitro pigment, azo pigment, condensed azo pigment, antraquinone pigment, quinacridone pigment, thioindigo pigment and phthalocyanine pigment.

23. The optical recording medium according to claim 21, wherein said dye comprises at least one material selected from a group consisting of an azo dye, an anthraquinone dye, an indigoid dye, a carbonium dye, a quinonimine dye, a methine dye, a quinoline dye, a nitro dye, a benzoquinone dye, a naphthoquinone dye, a naphthalimide dye, a perylene dye, a xanthene dye and phthalocyanine dye.

24. An optical recording medium having a pair of discs each including a recording layer containing organic coloring matter and a reflecting layer being sequentially formed on a light-transmissive substrate thereof, said discs being bonded in such a manner that said reflecting layers are disposed opposite to each other, whereby an information signal is recorded/reproduced when said light-transmissive substrate of at least either disc is irradiated with a laser beam, said optical recording medium comprising:
    a light absorbing layer on at least one of said discs and being formed more adjacent to an incident point of the laser beam as compared with said reflecting layer, through which the laser beam passes and which absorbs light in an absorption wavelength region of said recording layer,
    wherein said light absorbing layer is formed between said recording layer and said reflecting layer.

25. The optical recording medium according to claim 24, wherein said light-transmissive substrate comprises at least one material selected from a group consisting of polymethacryl resin, polycarbonate resin and polyolefine resin.

26. The optical recording medium according to claim 24, wherein said organic coloring matter comprises at least one material selected from a group consisting of cyanine coloring matter, phthalocyanine coloring matter, porphyrin coloring matter, xanthene coloring matter, styryl coloring matter, indigo coloring matter, squallylium coloring matter and metal complex coloring matter.

27. The optical recording medium according to claim 26, wherein said recording layer is formed by dispersing said organic coloring matter in a resin material.

28. The optical recording medium according to claim 27, wherein said resin, material comprises at least one material selected from a group consisting of vinyl chloride resin, vinyl acetate resin, vinyl chloride-vinyl acetate copolymer, polystyrene resin, polyether sulfon and silicon resin.

29. The optical recording medium according to claim 24, wherein said recording layer includes a deactivator comprising at least one material selected from a group consisting of a nickel metal complex compound, a copper complex compound, a hindered amine compound, an aromatic amine compound and aromatic ionium chloride.

30. The optical recording medium according to claim 24, wherein said recording layer has a thickness of 50 nm to 1000 nm.

31. The optical recording medium according to claim 24, further comprising a protective layer formed on said reflecting layer.

32. The optical recording medium according to claim 24, wherein said light absorbing layer comprises a material selected from the group consisting of a pigment and a dye.

33. The optical recording medium according to claim 32, wherein said pigment comprises at least one material selected from a group consisting of lake pigment, nitroso pigment, nitro pigment, azo pigment, condensed azo pigment, anthraquinone pigment, quinacridone pigment, thioindigo pigment and phthalocyanine pigment.

34. The optical recording medium according to claim 32, wherein said dye comprises at least one material selected from a group consisting of an azo dye, an anthraquinone dye, an indigoid dye, a carbonium dye, a quinonimine dye, a methine dye, a quinoline dye, a nitro dye, a benzoquinone dye, a naphthoquinone dye, a naphthalimide dye, a perylene dye, a xanthene dye and a phthalocyanine dye.

* * * * *